US008250760B2

(12) United States Patent
Petitjean et al.

(10) Patent No.: US 8,250,760 B2
(45) Date of Patent: Aug. 28, 2012

(54) CENTER HOUSING OF A TURBINE FOR A TURBOCHARGER AND METHOD OF MANUFACTURING THE SAME

(75) Inventors: Dominique Petitjean, Julienrupt (FR); Philippe Arnold Arnold, Henncourt (FR); David Rogala, Lorraine (FR); Patrick Masson, Thaou les Vosges (FR)

(73) Assignee: Honeywell International Inc., Morristown, NJ (US)

( * ) Notice: Subject to any disclaimer, the term of this patent is extended or adjusted under 35 U.S.C. 154(b) by 1263 days.

(21) Appl. No.: 11/579,305

(22) PCT Filed: May 3, 2004

(86) PCT No.: PCT/EP2004/004675

§ 371 (c)(1),
(2), (4) Date: Nov. 5, 2007

(87) PCT Pub. No.: WO2005/106212

PCT Pub. Date: Nov. 10, 2005

(65) Prior Publication Data

US 2008/0209905 A1 Sep. 4, 2008

(51) Int. Cl.
*B23P 15/00* (2006.01)
*F01D 17/16* (2006.01)

(52) U.S. Cl. ...... 29/889.2; 29/527.6; 415/158; 415/159; 415/165

(58) Field of Classification Search .................. 415/157, 415/158, 164, 159, 165; 29/889.2, 527.6
See application file for complete search history.

(56) References Cited

U.S. PATENT DOCUMENTS

| | | | | |
|---|---|---|---|---|
| 2,861,774 | A | 11/1958 | Buchi | |
| 4,586,336 | A | 5/1986 | Horler | |
| 5,758,500 | A | 6/1998 | Sumser et al. | |
| 6,443,696 | B1 * | 9/2002 | Erdmann et al. | 415/157 |
| 7,047,739 | B2 * | 5/2006 | Fledersbacher et al. | 60/602 |
| 2003/0123977 | A1 * | 7/2003 | Bertnik et al. | 415/158 |
| 2003/0190231 | A1 * | 10/2003 | Mulloy et al. | 415/158 |

FOREIGN PATENT DOCUMENTS

| | | |
|---|---|---|
| CH | 668455 | 12/1988 |
| WO | 0206636 | 1/2002 |
| WO | 03023194 | 3/2003 |
| WO | 2004022924 | 3/2004 |

OTHER PUBLICATIONS

ISR/WO Honeywell.

* cited by examiner

*Primary Examiner* — Edward Look
*Assistant Examiner* — Jesse Prager
(74) *Attorney, Agent, or Firm* — Alston & Bird LLP

(57) ABSTRACT

A turbine of a turbocharger comprises a floating insert which defines a nozzle for passing a fluid and which is supported axially slidable with respect to a housing by a sliding support means. Said floating insert is axially supported by said guiding means formed by a portion of a center housing.

6 Claims, 6 Drawing Sheets

CENTER HOUSING OF A TURBINE FOR A TURBOCHARGER AND METHOD OF MANUFACTURING THE SAME

BACKGROUND OF THE INVENTION

1. Field of the Invention

The present invention relates to a center housing of a turbine for a turbocharger and, in particular, to a center housing of a turbine for a turbocharger having an adjustable throat. Furthermore, the invention relates to a turbocharger and a turbine provided with such a center housing and a method of manufacturing the center housing.

2. Description of Related Art

In a conventional turbocharger for use in association with internal combustion engines, a turbocharger having an adjustable nozzle or throat is known from the state of the art. Such a conventional turbocharger comprises an exhaust gas driven turbine which, in turn, drives an inlet air compressor so as to compress inlet air to be supplied to a combustion chamber of the internal combustion engine.

Since the requirements with respect to emissions and fuel consumption have increased in the past, the need for a turbocharger with an improved efficiency has been established. Due to the above requirements, adjustable turbochargers for increasing the operation range based on the operation conditions of the associated internal combustion engine are needed.

According to the state of the art, a turbine for a turbocharger comprises a floating insert which is slidably mounted with respect to a housing portion. The floating insert forms an annular nozzle or passage for passing the fluid towards a turbine wheel. The annular passage is adjustable by axially moving the floating insert.

BRIEF SUMMARY OF THE INVENTION

It is the object of the present invention to provide a center housing of a turbine for a turbocharger having an adjustable throat providing an improved reliability and efficiency at decreased manufacturing costs. Furthermore, it is the object to provide a turbocharger and a turbine which respectively comprise such a center housing and to provide a method of manufacturing the center housing which improves the reliability and enhances the efficiency of the turbocharger at decreased manufacturing costs.

According to a first aspect of the present invention, a center housing of a turbine for a turbocharger comprising a floating insert defining a nozzle for passing a fluid, wherein a portion of said center housing forms a guiding means adapted to guide said floating insert axially slidably along said guiding means.

According to the structure of the first aspect of the present invention, the floating insert is guided by an element of the center housing while the axis of the shaft of the turbine wheel is defined by the same center housing. Thereby, it is possible to provide a structure in which the axis of the shaft of the turbine wheel and the axis of the floating insert coincide with a high accuracy. This structure, in turn, enables a minimization of the gap between the inside of a piston of the floating insert and the outer circumference of the turbine wheel for improving the efficiency of the turbocharger. Furthermore, a deviation of the alignment of the axes of the guiding means and of the shaft in operation or assembly is prevented or even impossible.

Preferably, said guiding means comprises a plurality of rod elements slidably holding a part of said floating insert along surfaces of the rod elements. With the rod elements used in the structure, the extent of material required for the guiding means is minimized while securing the guidance of said floating insert.

Preferably, said guiding means comprises clearances between the rod elements for passing said fluid towards a turbine wheel. Between the rod elements, wide clearances are provided for passing the flow of the fluid, such as an exhaust gas. Therefore, the pressure loss can be minimized.

Preferably, a rotational or symmetric axis of said guiding means coincides with the rotational axis of a support hole for supporting a turbine wheel. The support hole serves as a bearing bore for bearing a shaft of said turbine wheel. Thereby, the decreased gap with an accurate position between the inner circumference of the floating insert and the outer circumference of the turbine wheel can be achieved.

Preferably, said guiding means is formed integrally with said center housing. Thereby, the accuracy of the alignment of the center axes of the floating insert and of the turbine wheel can be enhanced, since the guiding means and the center housing itself cannot be moved relatively to each other.

Preferably, an annular protrusion is formed at an outer circumference of said floating insert which is in sliding contact with an inner surface of said guiding means. The annular protrusion defines the area of the floating insert which contacts the guiding means and, in particular, the rod elements thereof. Therefore, the friction and wear of the rod elements can be reduced.

According to further preferable form of the invention, said guiding means is formed as a recess in the center housing, wherein extensions formed at the floating insert are slidably engaged with said recess. Thus, by this structure it is possible to provide the sliding portion for slidably holding the floating portion at a portion of the center housing. In particular, the recess in the center housing corresponds to the shape of at least a portion of the extensions. In particular, at least the shapes of the sliding portions between the extensions and the recess are formed so as to correspond to each other.

Preferably, the inner circumferential surfaces of said extensions are in sliding contact with a surface of said recess facing radially outward. That is, the contact area is limited to the radial outward surface portion of the recess, thereby decreasing the area to be machined with a high precision. Also, a clearance between the extensions and the remaining surfaces of the recess is possible, which, in turn, enables the absorption of temperature induced dimensional changes in the structure. However, it is possible to arrange the sliding portions between the extensions and the recess in any other way as long as the guidance of the extensions in the recess with a high accuracy is achieved.

Preferably, the center housing further comprises a centering ring a surface of which being exposed to the flow of said fluid forms a fixed wall for the fluid to be fed to the turbine wheel. Thereby, the defined flow of the fluid towards the turbine wheel is achieved while enabling the design of the recess with a high degree of freedom. That is, by providing the centering ring it is possible to form the recess continuously, since the floating insert is held in its rotational position. Furthermore, the centering ring prevents foreign matter from entering into the recess.

Preferably, a centering ring is provided for preventing said floating insert from rotating about the rotational axis. Thereby, further means for keeping the rotational position of the floating insert are not required.

Preferably, said extensions comprise a stepped portion, wherein the axial movement of said floating insert is restricted by an abutment of said stepped portion on said centering ring. Thereby, the minimum opening degree of the throat is limited and can be set by forming the stepped portion at a predetermined position.

According to a second aspect of the present invention, a turbine comprises a center housing according to the above-mentioned first aspect. The turbine equipped with the center housing according to the first aspect of the present invention provides an enhanced efficiency and an improved reliability due to the higher accuracy and a decreased dimension of the gap between the outer circumference of the turbine wheel and the inner circumference of the floating insert.

According to a third aspect of the present invention, a turbocharger comprises a compressor for compressing a fluid and a turbine according to the above-mentioned second aspect. Such a turbocharger is provided with the advantages and the effects of the turbine as stated above.

According to a fourth aspect of the present invention, a method of manufacturing a center housing of a turbine according to the above-mentioned aspects is provided. The center housing is in particular adapted to be used for a turbine for a turbocharger comprising a floating insert, said floating insert defining a nozzle for passing a fluid and being axially slidable along guiding means formed by a portion of said center housing. The method of manufacturing a center housing according to the fourth aspect of the present inventions comprises the following steps:

preparing a semi-finished center housing comprising a bearing bore machining portion and a guiding means machining portion, holding said semi-finished center housing at a machining position on a machine tool, machining said bearing bore machining portion and said guiding means machining portion in a common step so as to obtain a bearing bore and a guiding means.

By machining the bearing bore and the guiding means in a common step, the accuracy of the alignment of the axes of the bearing bore and the guiding means is enhanced. Furthermore, the machining process is simplified, since only a single step is necessary. In particular, providing the bearing bore machining portion and the guiding means machining portion in the semi-finished center housing enables the process comprising such a single common step of machining.

Preferably, in the step of machining said bearing bore machining portion and said guiding means machining portion in a common step the position of a rotational axis of a tool of said tool machine is fixedly held. That is, the tool remains in a constant position with respect to the axis of the tool or the tool holder of the tool machine used. That has the effect that the accuracy with respect to the alignment of the bearing bore and of the guiding means is increased, since any deviations concerning the position of the tool can be avoided by fixing the position.

Preferably, in the step of machining said bearing bore machining portion and said guiding means machining portion in a common step the same tool of said tool machine is used. Thereby, the accuracy is further improved, since the tool is operated and actuated for both the bearing bore and the guiding means in one process. In case where the same tool is used for machining the bearing bore machining portion and the guiding means machining portion, the tool is prepared such that the machining process can be performed in a single step. That is, the tool comprises a portion for machining the bearing bore machining portion and a further portion for machining the guiding means machining portion.

Preferably, the step of preparing said semi-finished center housing comprises the step of casting. A cast semi-finished product can be finished in a simple manner and meets the requirements of operational loads which are applied to the turbocharger in operation.

Preferably, the step of preparing said semi-finished center housing comprises the step of integrally joining of at least two components so as to form an integral semi-finished center housing. That is, the semi-finished center housing can be manufactured from e.g. two parts which are joined before the machining. Preferably, said integrally joining includes welding. Thereby, complex shapes of the semi-finished center housing are possible, since the housing can be combined by at least two parts which can be manufactured in a simple way.

BRIEF DESCRIPTION OF THE SEVERAL VIEWS OF THE DRAWING

In the following, preferred embodiments and further technical solutions are described in detail with reference to the accompanying drawings.

DETAILED DESCRIPTION OF THE DRAWINGS

In the following, the structure of the turbine of the turbocharger and, in particular, of the center housing thereof according to preferred embodiments of the present invention is explained with reference to FIG. 1 to FIG. 8.

Figure 1:
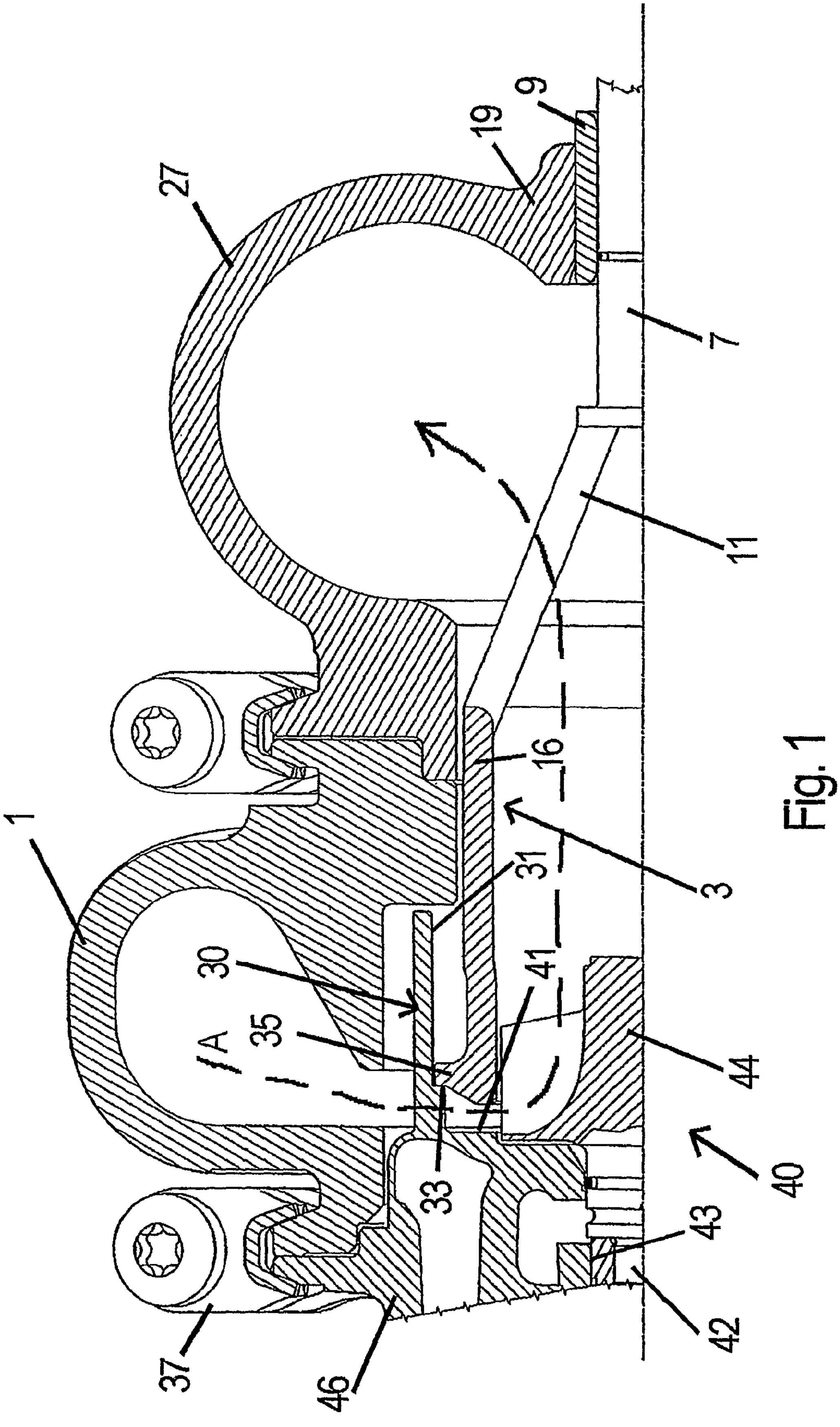
FIG. 1 is a longitudinal cross section of a turbine for a turbocharger according to the present invention.

A portion of a turbocharger, in particular, a turbine portion thereof, is shown in FIG. 1. In general, a turbocharger comprises a compressor (not shown) and an exhaust gas driven turbine 40. An impeller (not shown) of the compressor of the turbocharger is mounted on a shaft 42 which is driven by a wheel 44 of the gas turbine which, in turn, is driven by exhaust gas led towards the turbine wheel 44.

The turbine comprises a nozzle which is formed by an annular passage encompassing the turbine wheel 44. According to the present invention, the annular passage is formed by an inner wall 41 formed at a center housing 46 and an outer wall which is formed by a sliding piston 16 as a front portion of a floating insert 3, a portion of which is arranged around the turbine wheel 44.

The floating insert 3 according FIG. 1 comprises a plurality of support elements 11 (e.g. three support elements 11) which are provided so as to support the sliding piston 16 of the floating insert 3 on a sliding shaft 7. The support elements 11 formed in the shape of rods and are spaced in the radial direction so that the exhaust gas is passed through the clearances formed between the support elements 11. The exhaust gas is guided downstream of the turbine wheel 44 to a circumferential volute chamber formed by a discharge housing 27. The discharge housing 27 comprises an outlet (not shown) for discharging the exhaust gas from said discharge housing 27.

The turbine wheel 44 is disposed on the left side of the discharge housing 27 according to FIG. 1 into which exhaust gas is discharged after the exhaust gas has been expanded while traveling through the turbine wheel 44.

The free end of the sliding shaft 7 is slidably supported by a bushing 9. This support enables a smooth and accurate movement of the sliding shaft 7 in the axial direction of the sliding shaft 7. The bushing 9 for supporting the sliding shaft 7 is fit into a hole which is formed in a boss 19 of the discharge housing 27. Between the sliding shaft 7 and the bushing 9 a sealing ring disposed in a recess at the sliding shaft can be provided.

A guiding device is formed at the center housing 46 and protrudes into the space accommodating the turbine wheel 44 towards the discharge housing 27. The guiding device is formed by a plurality of rods (rod elements) 30 which are equiangular spaced from each other and which comprise surfaces 31. The outer circumference of the sliding piston 16 is in sliding contact with the surfaces 31 of the rods 30 facing towards the turbine wheel or towards a center of a circle formed by the rods 30.

In the following, the operation of the structure shown in FIG. 1 is explained.

For adjusting the annular passage for passing the exhaust gas towards the wheel of the turbine, the axial distance between the inner wall 41 of the center housing 46 and the outer wall formed at the end of the sliding piston 16 facing towards the inner wall 41 of the center housing 46 is changed. Thereby, the annular opening area of the nozzle can be adjusted so as to achieve optimum settings of the turbocharger system in correspondence with the operational condition thereof.

Furthermore, the exhaust gas which is discharged from the turbine 40 flows towards the discharge housing 27 as indicated by an arrow A in FIG. 1. The exhaust gas is directed towards the outer circumference of the interior of the discharge housing 27. Finally, the exhaust gas, which is directed as described above, is discharged from the discharge housing 27 to an exhaust system (not shown).

A first embodiment according to the present invention is explained with reference to FIG. 2 and FIG. 3.

Figure 2:
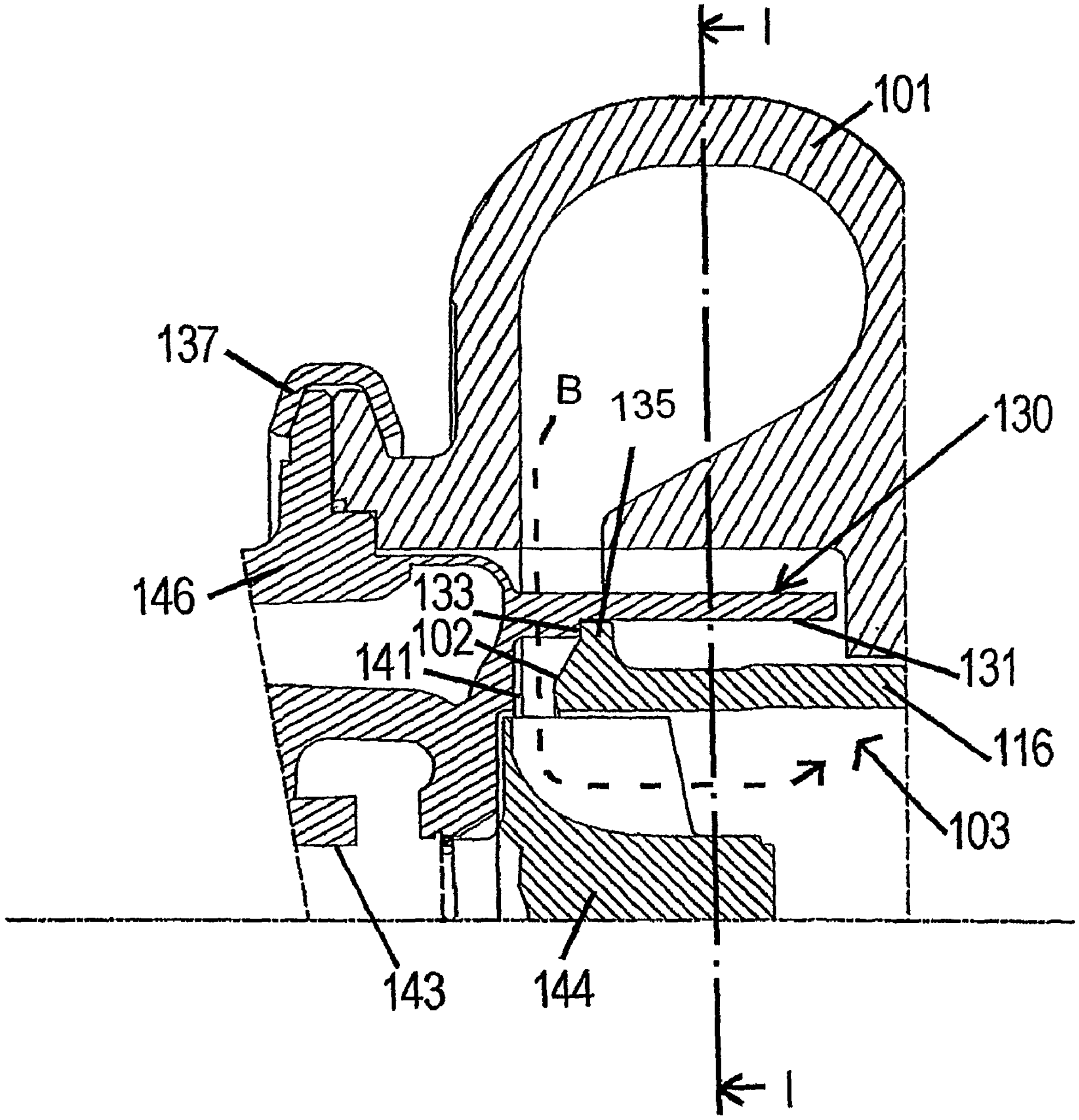
FIG. 2 is a longitudinal cross section of a turbine including a center housing according to a first embodiment of the present invention.

FIG. 2 shows a portion of a turbocharger, in particular, a portion of a turbine of said turbocharger. The turbine comprises a turbine wheel 144 which is supported by a shaft (not shown in FIG. 2) in a bearing bore 143. A compressor impeller (not shown) is supported by the same shaft and driven by the turbine wheel 144. The shaft supporting the turbine wheel 144 is held by a center housing 146. Such a support includes a sliding support bearing or any other bearing which ensures a high speed rotation while maintaining the axial position of the shaft with a high accuracy.

A turbine housing 101 is attached to the center housing 146 by a clamp 137. However, any other means for attaching the turbine housing and the center housing can be employed as long as an appropriate connection is established. In a recess between the mating surfaces of the center housing 146 and of the turbine housing 101, a sealing member 139 is inserted so as to seal the gap between the housings 101 and 146, which, however, can be eliminated as long as the sealed state between the housings 101 and 146 can be reached. The turbine housing 101 surrounds the turbine wheel 144 and is provided to direct exhaust gas through the nozzle towards the turbine wheel 144 so as to drive the same.

As shown in FIG. 2, a variable annular nozzle is defined by an inner wall 141 and an outer wall 102 of the floating insert 103. The inner wall 141 is a part of the center housing 144 and, therefore, fixed. The outer wall 102 is formed by an axial end of floating insert 103, in particular by the axial end surface of the sliding piston 116, which forms a part of the floating insert 103.

The floating insert 103 comprising the piston 116 is movable in the axial direction of the turbine wheel 144. The distance between the inner wall 141 and the outer wall 102 changes by axially moving the floating insert 103. That is, the width of the annular gap of surrounding the turbine wheel 144 for directing the exhaust gas towards the turbine wheel 144 is changed. As shown in FIG. 2 by an arrow B, the flow of the exhaust gas is directed from the turbine housing 101 through the annular passage, passed through the turbine wheel 144 and further led to the exhaust system.

As shown in FIG. 2, the piston 116 of the floating insert 103 comprises an annular protrusion 135 which is formed on the outer circumference of the piston 116. The outermost surface of the protrusion is formed as smooth surface. A guiding device comprising circularly arranged rod elements 130 is provided on the center housing 146, which rod elements 130 extend into the turbine housing 101. In the present embodiment, three rod elements 130 are provided which are arranged in a circle and each comprise inner surfaces 131 which face towards the turbine wheel 144. The outer circumferential surface of the protrusion 135 is in sliding contact with the inner surfaces 131 of the rod elements 130.

Figure 3:
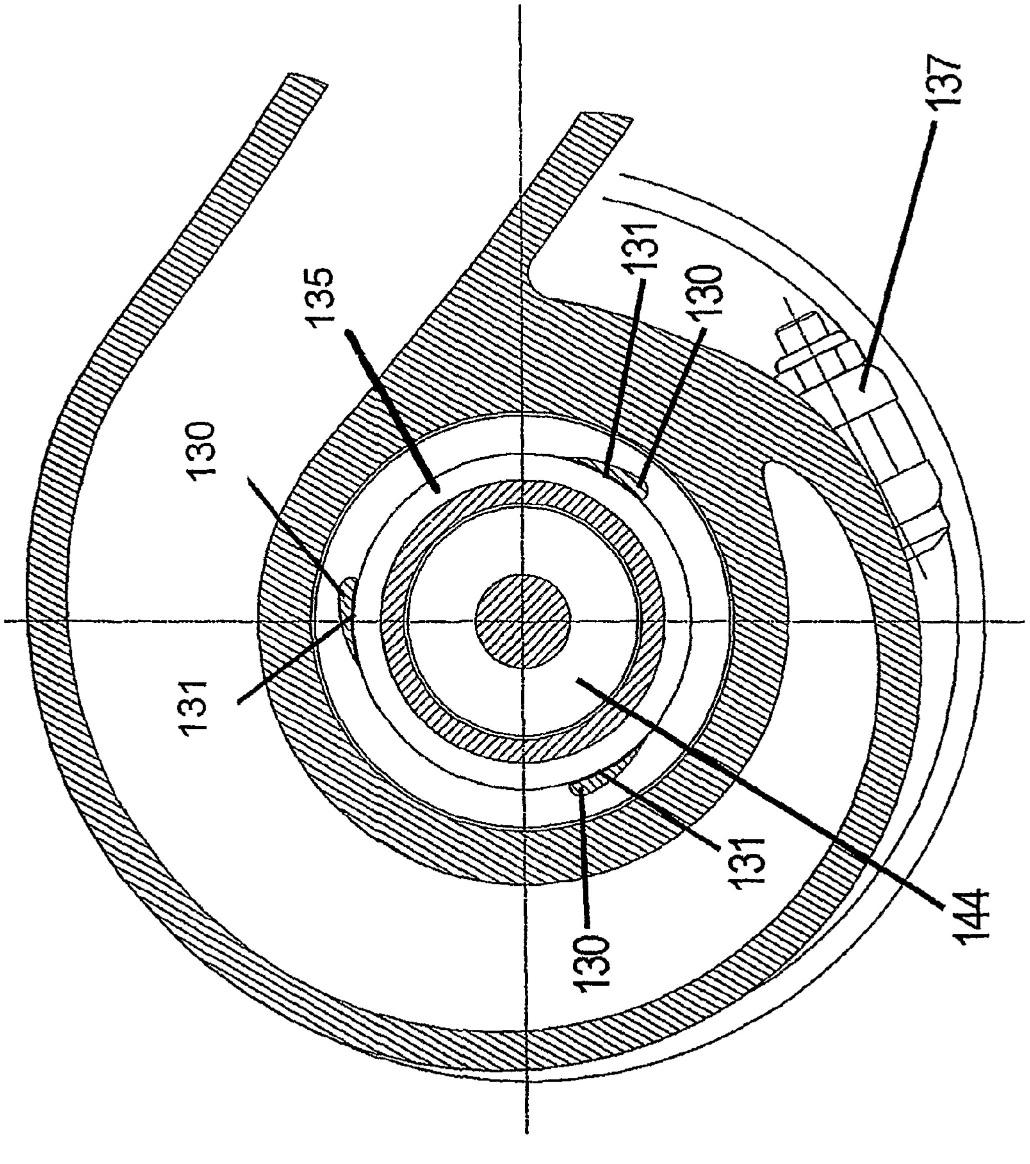
FIG. 3 is a sectional view of the turbine according to the first embodiment of the present invention along a line I-I in FIG. 2.

A shown in more detail according to FIG. 3, the piston 116 and, in particular, the protrusion 135 thereof is in sliding contact with the inner surface 131 of the rod elements 130 of the guiding device. The inner diameter of the guiding device (guiding means) formed by the rod elements 130 substantially corresponds to the outer diameter of the protrusion 135 of the piston 116 of the floating insert 103. Thereby, the piston 116 of the floating insert 103 is guided by the inner surfaces 131 of the rod elements 130. Since the guiding device is formed by the angularly spaced rods 130, as can be seen in FIG. 3, the flow of the exhaust gas towards the turbine wheel 144 is enabled through the clearances between the rods 130.

The cross-section of the rod elements 130 is wing shaped so as to further improve the flow characteristics of the nozzle for directing the exhaust gas towards the turbine wheel 144.

The guiding device according to the present embodiment is formed as a part of the center housing 146. In particular, the rods 130 are formed integrally with the center housing 146. Therefore, the central axis of the turbine wheel 144 and the central axis of the piston 116 of the floating insert 103 coincides with a high accuracy. For this reason, the distance between the inner surface of the piston 116 and the blades of the turbine wheel 144 can be set smaller, thereby increasing the efficiency of the turbine system. In particular, the loss of pressure due to exhaust gas leaking through the gap between the turbine wheel 144 and the piston 103 can be decreased.

Furthermore, the rods 130 of the guiding device each comprise a step portion 133. The protrusion 135 of the piston 116 abuts to the step portion 133 at a predetermined axial position of the piston 116. Thereby, the piston 116 is prevented from outrunning a predetermined range.

In the following, a second embodiment according to the present invention is explained with reference to FIGS. 4-6. The structure of the embodiment shown in FIGS. 2 and 3 is similar to the structure shown in FIGS. 4-6. In the following, merely the differences between the structures shown in FIGS. 2 and 3 and FIGS. 4-6 are explained.

Figure 4:
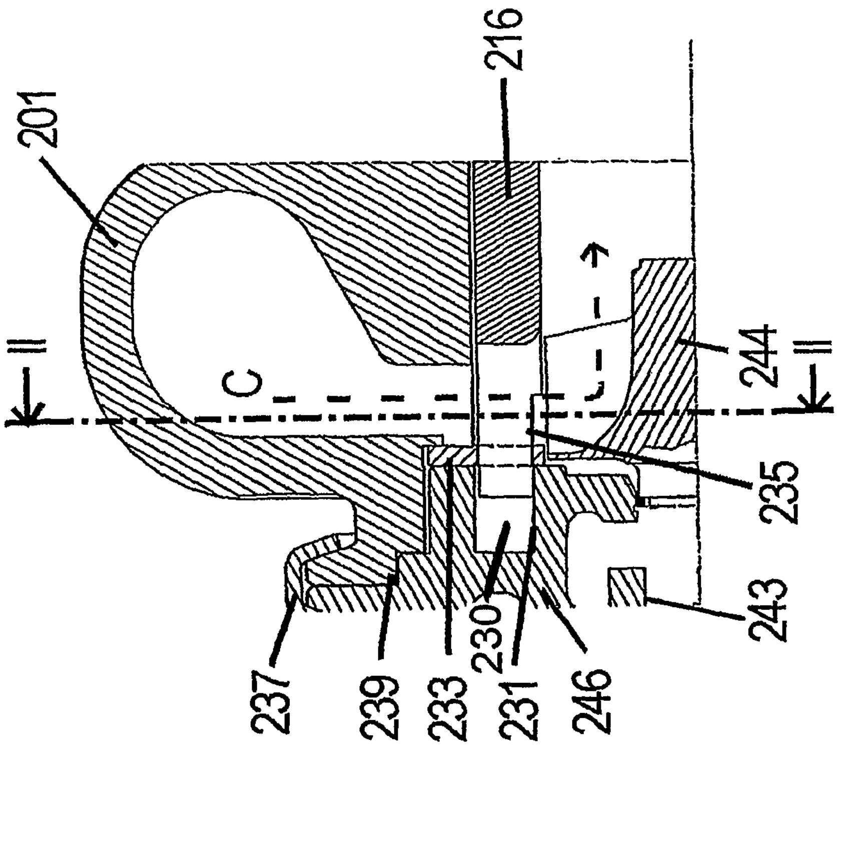
FIG. 4 is a longitudinal cross section of the turbine including a center housing according to a second embodiment of the present invention with the throat being in an opened position.

The turbine according to FIG. 4 comprises a turbine wheel 244, a turbine housing 201 which is attached to a center housing 246 by a clamp 237 and a floating insert 203. However, any other means for attaching the turbine housing and the center housing can be employed as long as an appropriate connection is established. The floating insert 203 comprises a piston 216 which surrounds the turbine wheel 244. At the side of the piston 216 facing to the center housing 246, extensions 235 are provided, which are disposed in equal angular distances throughout the circumference of the piston, as can be seen in FIG. 6. The extensions 235 are formed with a wing shaped cross sections so as to further improve the flow characteristics in the nozzle.

In FIG. 4 the piston 216 is shown in an opened condition. Clearances are provided between the extensions 235 for providing a flow path from the turbine housing 201 towards the turbine wheel 244. Through the clearances, a flow is enabled towards the turbine wheel 244, which is indicated by an arrow C in FIG. 4 and FIG. 5. In the opened condition, the extensions 235 slightly protrude into a recess 230 and are in sliding contact with the inner circumference thereof. In particular, the extensions 235 are in sliding contact with surfaces 231. The surfaces 231 are formed in the same shape as those portions of the extensions 235 which are in sliding contact with the surfaces 231.

Figure 5:
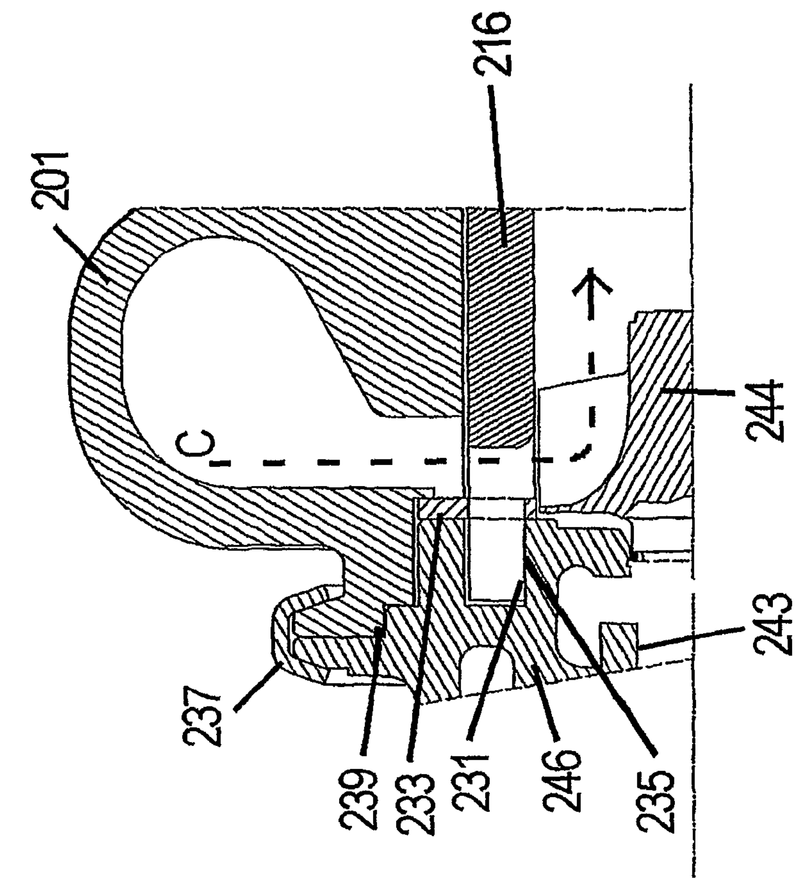
FIG. 5 is a longitudinal cross section of the turbine including the center housing according to the second embodiment of the present invention with the throat being in a closed position.
Figure 6:
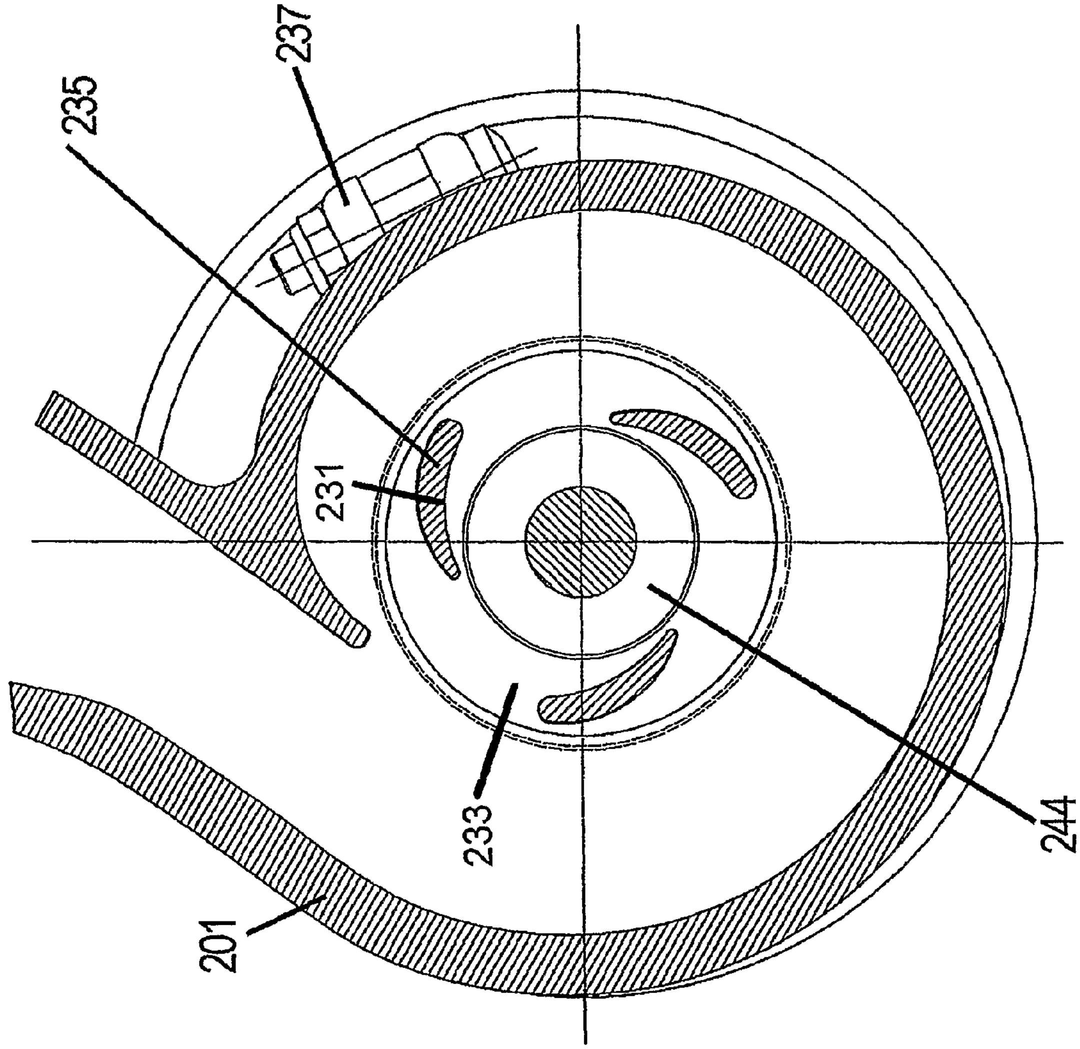
FIG. 6 is a sectional view of the turbine including the center housing according to the second embodiment of the present invention along a line II-II in FIG. 4.

FIG. 5 shows the turbine with the piston 216 in a closed condition. In this condition, the extensions 235 are inserted into the recess 230 to such an extent that the step portion provided at the end of the inner surface of the extensions 235 is in abutment with a centering ring 233.

Figure 8:
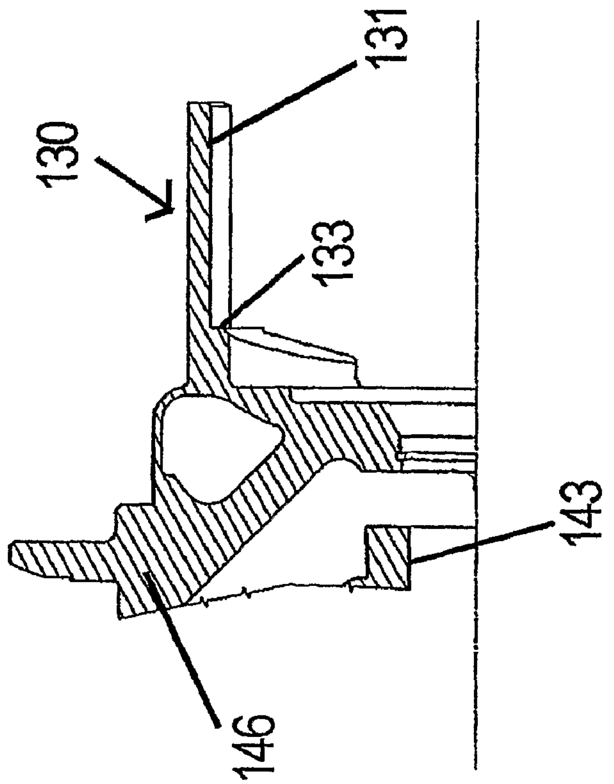
FIG. 8 is a longitudinal cross section of the center housing of the turbine shown in FIG. 2 showing the machined product achieved by the method of manufacturing according to the third embodiment of the present invention.

The centering ring 233 is shown in more detail in FIG. 8. The centering ring 233 comprises holes which correspond to the positions and shapes of the extensions 235 of the piston 216. The piston 216 is prevented from rotating in the assembled state by the centering ring 233, since the centering ring 233 itself is held between the center housing 246 and the turbine housing 201. Furthermore, the assembly is simplified with the provision of the centering ring 233.

The centering ring 233 comprises a surface which faces towards the piston 216. This surface of the centering ring 233 which is exposed to the flow of the fluid forms a fixed wall for the fluid to be correctly fed to the turbine wheel.

In the following, according to a third embodiment of the present invention, a method of manufacturing a center housing of a turbine for a turbocharger according to the present invention is explained based on the center housing shown in FIG. 7 and FIG. 8. The center housing according to FIGS. 7 and 8 is applicable to the turbine for the turbocharger according to the above embodiment shown in FIG. 2 and FIG. 3.

Figure 7:
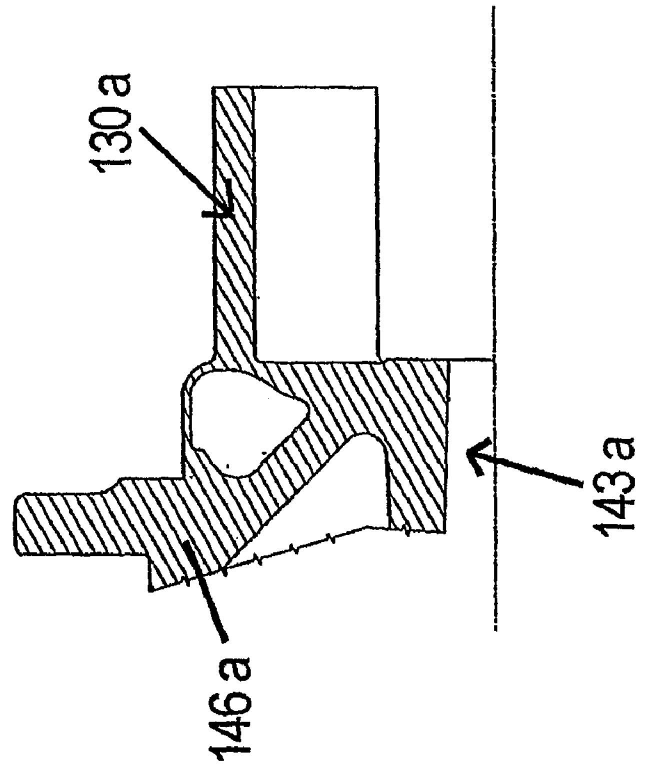
FIG. 7 is a longitudinal cross section of the center housing of the turbine shown in FIG. 2 showing the cast product before the machining for explaining the method of manufacturing according to the third embodiment of the present invention.

FIG. 7 shows a semi-finished center housing **146*a* as a cast product before the machining. In particular, the semi-finished center housing 146*a* according to FIG. 7 does not comprise a bearing bore for the shaft of the turbine wheel and no finished sliding surface at the guiding device. The semi-finished center housing comprises a bearing bore machining portion 143*a* and a guiding means machining portion 130*a*** which are provided with a certain oversize so as to enable a material removing machining process.

As described in detail according to the first embodiment, the axial alignment of the imaginary circles formed by the rods of the guiding means and the bearing bore of the center housing enables the decrease of the gap between the turbine wheel and the piston of the floating insert.

According to the method of manufacturing the center housing according to the present invention, the bearing bore machining portion **143*a* and the guiding means machining portion 130*a*** are machined commonly in a single step.

That is, the bearing bore machining portion **143*a* and the guiding means machining portion 130*a* are machined while the semi-finished center housing 146*a* is remains clamped on the tool machine, such as a grinding machine or the like. The result is the center housing 146 shown in FIG. 8 which includes the finished bearing bore 143 and the finished surfaces 131 of the rods 130** of the guiding device.

Thereby, the machining process is improved, since the center housing 146 is provided with a bearing bore 143 and a guiding device 131 the alignment of which can be enhanced to a high extent. Thus, the efficiency of the turbocharger is improved due to the decrease of the gap between the turbine wheel and the sliding piston.

However, the semi-finished center housing **146*a* can be unclamped from the tool machine in the process of machining the bearing bore machining portion 143*a* and the guiding means machining portion 130*a*** as long as the position for machining these portions is such that an accurate alignment of the axes is achieved.

Furthermore, the method of manufacturing a center housing of a turbocharger as explained above is also applicable to the center housing of a turbine according the second embodiment shown in FIGS. 4-6.

For applying the method according to the present invention to the center housing according to the second embodiment, the center housing shown in FIGS. 6-8 is manufactured by machining the bearing bore 243 for the shaft of the turbine wheel 244 and the inner circumferential surface of the recess 230. Corresponding to the method according to the present invention, the machining process comprises a common step of machining the bearing bore and the recess at the same machining process without unclamping the center housing 246. Thereby, the alignment of the bearing bore 243 and the inner circumferential surface 231 of the recess 230 is improved.

The recess 230 is formed by a portion of the center housing 246. The axis of the support hole serving as the bearing bore 243 for supporting the shaft of the turbine wheel 244 and the axis of the virtual circle formed by the surfaces 231 of the recess 230 coincide with a high accuracy. Therefore, the gap between the inner diameter of the piston 216 and the outer diameter of the turbine wheel 244 can be minimized. Therefore, the same effects as above stated can be achieved.

The invention is not limited to the above described embodiments thereof. In particular, the single structures according to the above explained embodiments can be freely combined with each other.

The invention claimed is:

1. A method of manufacturing a center housing of a turbocharger, comprising the steps of:

preparing a semi-finished center housing comprising a bearing bore machining portion and a guiding mechanism machining portion;

holding said semi-finished center housing at a machining position on a machine tool; and machining said bearing bore machining portion and said guiding mechanism machining portion in a common step so as to obtain an axially aligned bearing bore and a guiding mechanism in the form of a plurality of circumferentially spaced guide members each of which is an integral part of the center housing.

2. A method according to claim 1, wherein in the step of machining of said bearing bore machining portion and of said guiding mechanism machining portion in a common step the position of a rotational axis of a tool of said tool machine is fixedly held.

3. A method according to claim 1, wherein in the machining said bearing bore machining portion and said guiding mechanism machining portion in a common step the same tool of said tool machine is used.

4. A method according to claim 1, wherein the step of preparing said semi-finished center housing comprises the step of casting.

5. A method according to claim 1, wherein the step of preparing said semi-finished center housing comprises the step of integrally joining at least two components so as to form an integral semi-finished center housing.

6. A method according to claim 5, wherein said integrally joining includes welding.

* * * * *